US012773930B2

(12) United States Patent
Laplante et al.

(10) Patent No.: US 12,773,930 B2
(45) Date of Patent: Oct. 27, 2026

(54) CHILD RESTRAINT SYSTEM INCLUDING INTERNAL SIDE IMPACT SURFACES

(71) Applicant: Graco Children's Products Inc., Atlanta, GA (US)

(72) Inventors: Phillip Michael Laplante, Cumming, GA (US); Adam Andrew McKenzie, Decatur, GA (US); Thomas Jake Mitchell, Smyrna, GA (US)

(73) Assignee: Graco Children's Products Inc., Atlanta, GA (US)

( * ) Notice: Subject to any disclaimer, the term of this patent is extended or adjusted under 35 U.S.C. 154(b) by 142 days.

(21) Appl. No.: 18/787,992

(22) Filed: Jul. 29, 2024

(65) Prior Publication Data

US 2025/0042313 A1 Feb. 6, 2025

Related U.S. Application Data

(60) Provisional application No. 63/516,995, filed on Aug. 1, 2023.

(51) Int. Cl.
*B60N 2/28* (2006.01)

(52) U.S. Cl.
CPC ......... *B60N 2/2884* (2013.01); *B60N 2/2872* (2013.01)

(58) Field of Classification Search
CPC ............................ B60N 2/2884; B60N 2/2872
USPC ..................................................... 297/216.11
See application file for complete search history.

(56) References Cited

U.S. PATENT DOCUMENTS

| | | | | |
|---|---|---|---|---|
| 7,086,695 B2 * | 8/2006 | Hosoya | B60N 2/2821 297/256.16 |
| 7,234,771 B2 | 6/2007 | Nakhla | |
| 7,506,926 B2 | 3/2009 | Carine | |
| 7,744,154 B2 * | 6/2010 | Marsden | B60N 2/4235 297/250.1 |
| 7,810,883 B2 | 10/2010 | Berger et al. | |
| D629,220 S | 12/2010 | Xu et al. | |
| D636,190 S | 4/2011 | Werschmidt et al. | |
| 8,061,768 B2 | 11/2011 | Amirault et al. | |
| 8,342,602 B2 | 1/2013 | Bonne | |

(Continued)

FOREIGN PATENT DOCUMENTS

| | | |
|---|---|---|
| CN | 3378421 | 7/2004 |
| CN | 301887173 S | 4/2012 |

(Continued)

*Primary Examiner* — Jose V Chen
(74) *Attorney, Agent, or Firm* — Eversheds Sutherland (US) LLP

(57) ABSTRACT

A child restraint system is provided. The child restraint system includes a seat, a headrest, a first sidewall, a second sidewall, and a plurality of internal side impact surfaces including at least a first internal side impact surface that is provide at the first sidewall and a second internal side impact surface that is provided at the second sidewall. In embodiments, four internal side impact surfaces may be provided as well. A pocket is formed in the area between the internal side impact surfaces and respective sidewalls. In this manner, as a child moved towards a sidewall during a crash event, the elbow or entire arm of the child falls into the pocket and the internal side impact surfaces mitigate the movement of the hips and/or shoulders of the child. This reduces the compression of the child's arm against the sidewall, consequentially reducing the compression on the child's chest.

16 Claims, 17 Drawing Sheets

(56) References Cited

U.S. PATENT DOCUMENTS

| | | | | |
|---|---|---|---|---|
| 8,579,369 | B2 * | 11/2013 | Gaudreau, Jr. | B60N 2/2812 297/250.1 |
| 8,684,456 | B2 | 4/2014 | Powell | |
| 8,777,322 | B2 * | 7/2014 | Horton | B60N 2/2851 297/484 |
| D730,651 | S | 6/2015 | Perego | |
| 9,539,921 | B2 | 1/2017 | Dale et al. | |
| 9,776,535 | B2 | 10/2017 | Ishisako | |
| D804,832 | S | 12/2017 | Pos | |
| 9,908,444 | B2 | 3/2018 | Haas et al. | |
| 10,118,510 | B2 | 11/2018 | McRoberts et al. | |
| D837,537 | S | 1/2019 | Huntley et al. | |
| 10,182,951 | B2 | 1/2019 | Bourgraf et al. | |
| D847,520 | S | 5/2019 | Imrich et al. | |
| D855,335 | S | 8/2019 | Lin | |
| 10,414,297 | B2 | 9/2019 | Pos | |
| D876,111 | S | 2/2020 | Imrich et al. | |
| 10,632,871 | B2 | 4/2020 | Schmitz et al. | |
| RE47,971 | E | 5/2020 | Tanner et al. | |
| 10,780,857 | B1 | 9/2020 | Rajasingham | |
| D914,376 | S | 3/2021 | Jane Santamaria | |
| D928,519 | S | 8/2021 | Fu | |
| D938,171 | S | 12/2021 | Duan | |
| 11,198,380 | B2 | 12/2021 | Guo | |
| D943,295 | S | 2/2022 | Zhao | |
| 11,247,588 | B2 | 2/2022 | Kaiser | |
| 11,377,008 | B2 | 7/2022 | Kato et al. | |
| D961,947 | S | 8/2022 | Gelderen | |
| D963,354 | S | 9/2022 | Gelderen | |
| D970,910 | S | 11/2022 | Liu | |
| 11,505,154 | B2 | 11/2022 | Lee | |
| 11,511,656 | B2 | 11/2022 | Hsu et al. | |
| 11,548,468 | B2 | 1/2023 | Tanaka et al. | |
| 11,560,073 | B2 | 1/2023 | Pos | |
| D979,258 | S | 2/2023 | Huntley et al. | |
| D979,954 | S | 3/2023 | Huntley et al. | |
| D984,147 | S | 4/2023 | Gelderen et al. | |
| 11,639,121 | B2 | 5/2023 | Zhang | |
| D997,576 | S | 9/2023 | Huntley et al. | |
| D998,980 | S | 9/2023 | Van Gelderen | |
| 11,745,629 | B2 | 9/2023 | Mo et al. | |
| 12,162,387 | B2 * | 12/2024 | Oltman | B60N 2/2881 |
| 12,491,802 | B2 * | 12/2025 | Mo | B60N 2/2887 |
| 2003/0090134 | A1 * | 5/2003 | James | B60N 2/885 297/250.1 |
| 2003/0155797 | A1 * | 8/2003 | Amirault | B60N 2/885 297/411.3 |
| 2004/0124676 | A1 * | 7/2004 | Kain | B60N 2/2851 297/484 |
| 2004/0251721 | A1 * | 12/2004 | Yoshida | B60R 21/2338 297/452.41 |
| 2008/0258518 | A1 * | 10/2008 | Jane Santamaria | B60N 2/42709 297/216.11 |
| 2009/0179470 | A1 * | 7/2009 | Bass | B60N 2/2881 297/216.12 |
| 2010/0026059 | A1 * | 2/2010 | Amirault | B60N 2/4249 297/216.11 |
| 2012/0306243 | A1 * | 12/2012 | Oltman | B60N 2/4235 297/216.11 |
| 2015/0091344 | A1 * | 4/2015 | Tanner | B60N 2/2872 297/216.11 |
| 2019/0031960 | A1 * | 1/2019 | Kou | B32B 5/245 |
| 2020/0223331 | A1 * | 7/2020 | Mason | B60N 2/2872 |
| 2022/0371483 | A1 * | 11/2022 | Hasan | B60N 2/2872 |
| 2023/0001832 | A1 * | 1/2023 | Oltman | B60N 2/2872 |
| 2023/0016423 | A1 | 1/2023 | Carine | |
| 2023/0129335 | A1 * | 4/2023 | Nakhla | B60N 2/286 297/216.11 |
| 2023/0211709 | A1 | 7/2023 | Chen | |
| 2024/0123877 | A1 * | 4/2024 | Gillett | B60N 2/2872 |
| 2024/0166097 | A1 * | 5/2024 | Nakhla | B60N 2/286 |
| 2024/0217400 | A1 * | 7/2024 | Lehman | B60N 2/2866 |

FOREIGN PATENT DOCUMENTS

| | | | | |
|---|---|---|---|---|
| CN | 103153696 | B | 6/2013 | |
| CN | 302515140 | S | 7/2013 | |
| CN | 302885992 | S | 7/2014 | |
| CN | 302934192 | S | 9/2014 | |
| CN | 303026744 | S | 12/2014 | |
| CN | 304001031 | S | 12/2014 | |
| CN | 303261293 | S | 7/2015 | |
| CN | 2014304356887 | | 7/2015 | |
| CN | 303314194 | S | 8/2015 | |
| CN | 2015303194381 | | 1/2016 | |
| CN | 102741085 | B | 5/2016 | |
| CN | 303715049 | S | 6/2016 | |
| CN | 303821440 | S | 8/2016 | |
| CN | 303821441 | S | 8/2016 | |
| CN | 303964117 | S | 12/2016 | |
| CN | 2016303005685 | | 12/2016 | |
| CN | 107499197 | A | 12/2017 | |
| CN | 105398359 | B | 3/2018 | |
| CN | 304527429 | S | 3/2018 | |
| CN | 304648721 | S | 5/2018 | |
| CN | 109278602 | A | 1/2019 | |
| CN | 109649228 | A | 4/2019 | |
| CN | 305621874 | S | 2/2020 | |
| CN | 305770586 | S | 5/2020 | |
| CN | 306074987 | S | 9/2020 | |
| CN | 114683976 | A | 7/2022 | |
| CN | 111565969 | B | 10/2022 | |
| CN | 115476744 | A | 12/2022 | |
| EP | 1486384 | A2 * | 12/2004 | B60N 2/2851 |
| WO | 2022003034 | A1 | 1/2022 | |
| WO | 2022219154 | A1 | 10/2022 | |
| WO | 2022223706 | A1 | 10/2022 | |
| WO | 2023073002 | A1 | 5/2023 | |

* cited by examiner

CHILD RESTRAINT SYSTEM INCLUDING INTERNAL SIDE IMPACT SURFACES

CROSS REFERENCE TO RELATED APPLICATION

This application is a continuation of and claims priority to, U.S. Provisional Application No. 63/516,995 filed Aug. 1, 2023, entitled "Child Restraint System Including Side Impact Bumpers," the disclosure of which is incorporated herein by reference in its entirety.

TECHNICAL FIELD

The present disclosure is generally in the field of child restraint systems, and more particularly related to child restraint systems including internal side impact surfaces.

BACKGROUND

Child restraint systems (for example, a child's car seat) may include a headrest, a seat, a rear portion, and one or more sidewalls. These child restraint systems may be used to secure the child within a vehicle and may also be used to mitigate the impact of a crash event of the vehicle on the child. For example, the child restraint system may include at least some compressible material that may compress during the crash event to mitigate the force of impact of the child against the child restraint system and/or a door of the vehicle. However, in existing child restraint systems, the arm of the child may first come into contact with a sidewall of the child restraint system during a crash event. The arm may compress against the sidewall, which in turn may cause an undesirable compression of the child's chest.

SUMMARY

In embodiments, the present disclosure describes a child restraint system comprising a seat, a headrest, a first sidewall and a second sidewall, and a plurality of internal side impact surfaces including at least a first internal side impact surface that is removably inserted into the first sidewall or is formed as a raised portion of the first sidewall and a second internal side impact surface that is removably inserted into the second sidewall or is formed as a raised portion of the second sidewall. In embodiments, a first void is formed above or below the first internal side impact surface and the first sidewall and a second void is formed above or below the second internal side impact surface and the second sidewall. In embodiments, at least one of: the first void or the second void are configured to receive, during a crash event, an elbow or an arm of a vehicle occupant seated in the child restraint system.

In embodiments, the present disclosure describes a child restraint system comprising a first zone including a seat, a second zone including a first sidewall and a second sidewall, and a third zone including a headrest. In embodiments, at least one of the first zone or the second zone are offset from the second zone. In embodiments, the second zone includes a first void or a first compressible material and the second zone includes a second void or a second compressible material. In embodiments, the second zone is configured to receive, during a crash event, an elbow or an arm of a vehicle occupant seated in the child restraint system.

In embodiments, the present disclosure describes a child restraint system comprising a seat, a headrest, a first sidewall and a second sidewall, and a plurality of internal side impact surfaces including at least a first internal side impact surface that is removably inserted into the first sidewall and a second internal side impact surface that is removably inserted into the second sidewall. In embodiments, a first void is formed between the first internal side impact surface and the first sidewall and a second void is formed between the second internal side impact surface and the second sidewall. In embodiments, the child restraint system also includes a first compressible material provided in the first void and a second compressible material provided in the second void, wherein the first compressible material is configured to compress further than the first internal side impact surface and the second compressible material is configured to compress further than the second internal side impact surface. In embodiments, the first compressible material or the second compressible material are configured to receive, during a crash event, an elbow or an arm of a vehicle occupant seated in the child restraint system.

In embodiments, the present disclosure describes a child restraint system comprising a seat, a headrest, a first sidewall and a second sidewall, and a plurality of internal side impact surfaces including at least a first internal side impact surface that is adjustable between the headrest and the first sidewall and a second internal side impact surface that is adjustable between the headrest and the second sidewall. In embodiments, a first void is formed above or below the first internal side impact surface and the first sidewall or the headrest and a second void is formed above or below the second internal side impact surface and the second sidewall or the headrest. In embodiments, at least one of: the first void or the second void are configured to receive, during a crash event, an elbow or an arm of a vehicle occupant seated in the child restraint system.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

Figure 1A:
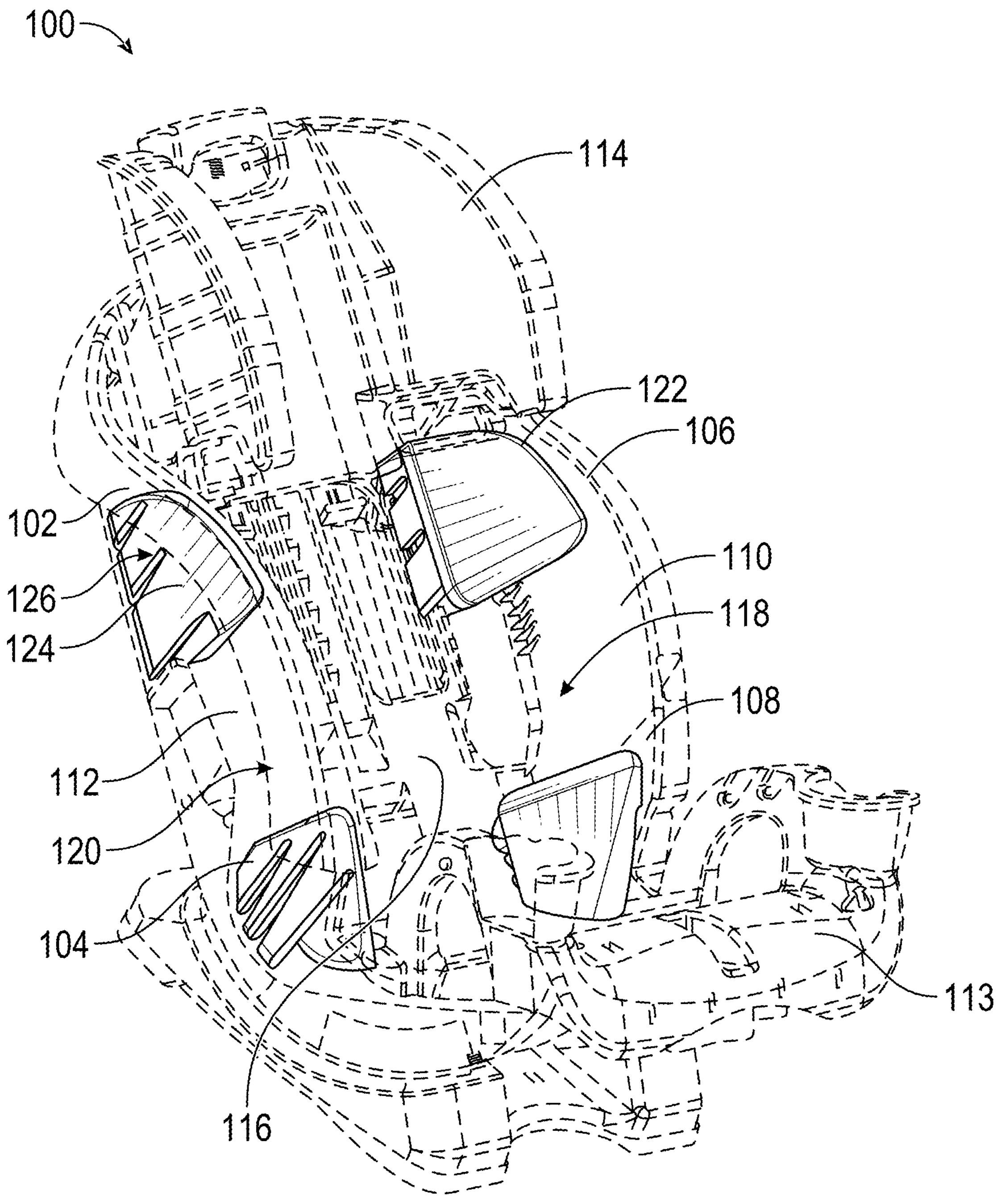
FIG. 1A is a perspective view of a child restraint system including internal side impact surfaces.

The present disclosure provides a more detailed and specific description with reference to the accompanying drawings. The drawings and specific descriptions of the drawings, as well as any specific or other embodiments discussed, are intended to be read in conjunction with the entirety of this disclosure.

DETAILED DESCRIPTION

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical elements throughout.

Child restraint systems may be different types of seats that are used to secure children (or other passengers) within moving bodies, such as vehicles (the term "vehicle occupant" may also be used generally herein). A child restraint system may include a headrest used to support the head of the child (or any other type of vehicle occupant) and also protect the child from injury during a crash event of the vehicle. In embodiments, the headrest may be a separate apparatus that is removably inserted into the seat of the child restraint system. However, in other embodiments, the headrest may be permanently coupled to the seat of the child restraint system as well.

The child restraint system may also include a seat, a rear portion, and one or more sidewalls that extend outwardly from the rear portion. That is, when the child restraint system is provided within a vehicle and the child is seated in the child restraint system, the rear portion of the child restraint system is located behind the child and the one or more sidewalls are located on either side of the child. For example, the one or more sidewalls may include a left sidewall that is located to the left of the child and a right sidewall that is located to the right of the child.

The sidewalls may also be configured to compress or otherwise mitigate the impact of a crash event of the vehicle on the child that is seated in the child restraint system. However, in some existing child restraint systems, an arm of the child may first come into contact with one of the sidewalls during the crash event. As the arm compresses into the sidewall, it may also cause an undesirable compression of the child's chest against the arm.

To reduce the amount of compression of the child's chest that occurs during a crash event, the child restraint system as described in the present disclosure includes multiple internal side impact surfaces. As is further illustrated in FIG. 3, the internal side impact surfaces may be provided at the sidewalls above and below the position of the child's arms in the child restraint system. In this manner, a void is formed in the area between a given internal side impact surface and the corresponding sidewall of the child restraint system.

In embodiments, two upper internal side impact surfaces may be provided at the sidewalls of the child restraint system proximate to a location of the child's shoulders when the child is in a seated position in the child restraint system. Additionally, two lower internal side impact surfaces may be provided at the sidewalls of the child restraint system proximate to a location of the child's hips when the child is in a seated position in the child restraint system. In alternative embodiments, only two internal side impact surfaces are provided.

During a crash event, as the child's body travels towards a given sidewall, the internal side impact surface(s) provided at that sidewall mitigate (or prevent) the movement of the child's shoulders and/or hips towards the sidewall. Simultaneously, the void provided between the internal side impact surface(s) and the sidewall receives the elbow (or entire arm) of the child. That is, the elbow (or entire arm) "falls" into the void while the internal side impact surface(s) mitigate or prevent further movement of the child towards the sidewall. Thus, the compression of the elbow (or entire arm) against the sidewall is minimized, consequentially minimizing the compression of the child's arm against the child's chest.

Figure 1B:
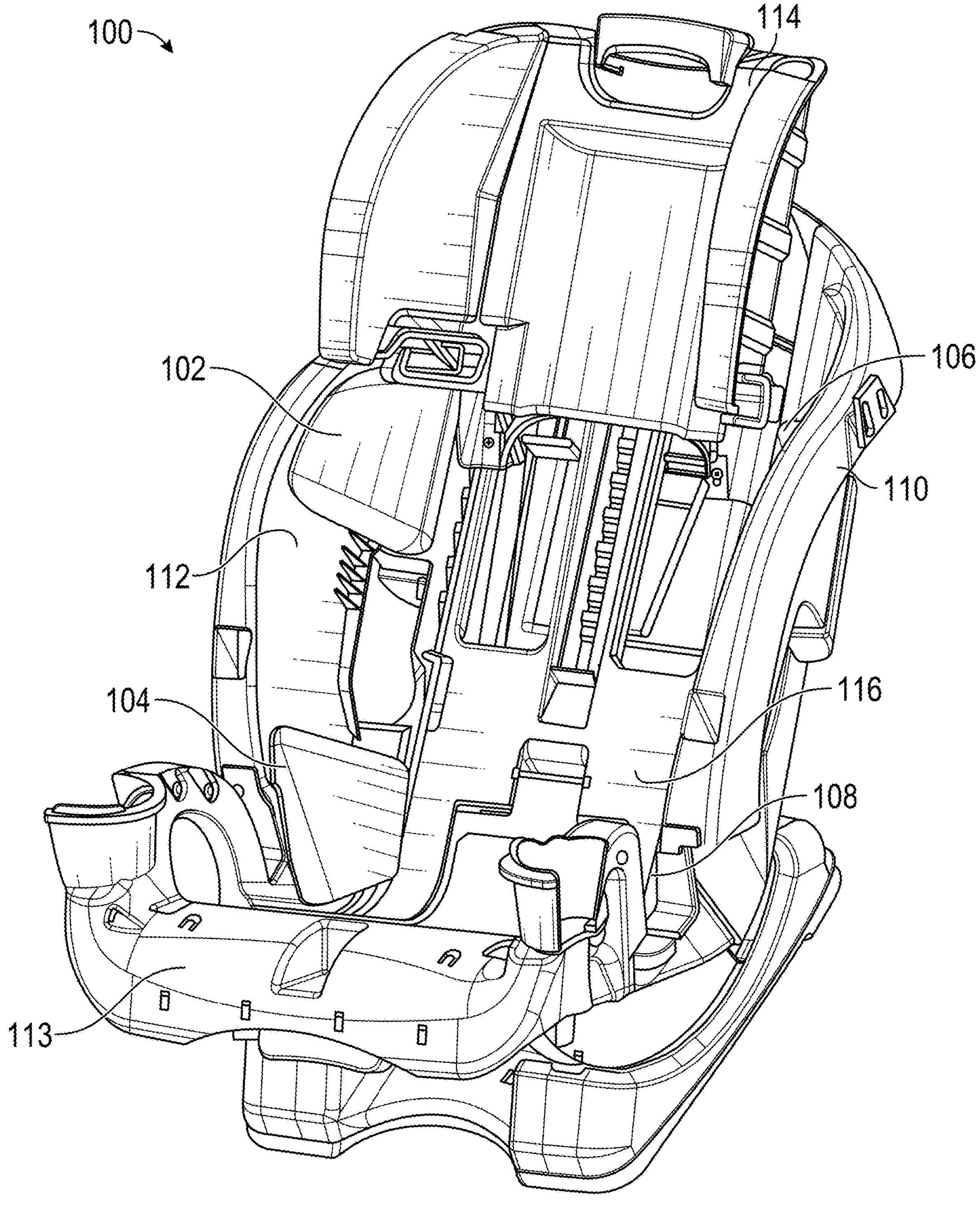
FIG. 1B is another perspective view of the child restraint system of FIG. 1A.
Figure 1C:
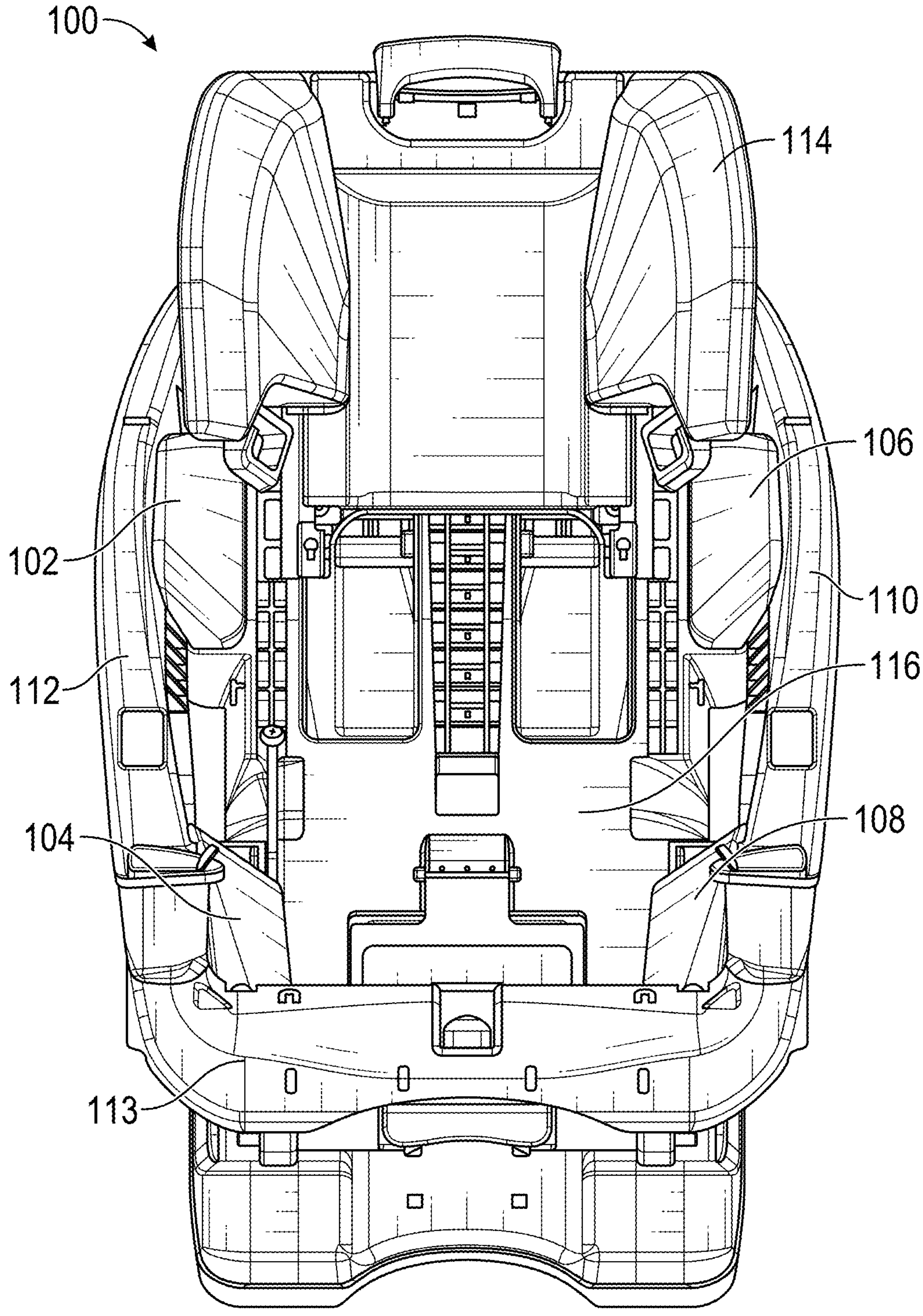
FIG. 1C is a front view of the child restraint system of FIG. 1A.
Figure 1D:
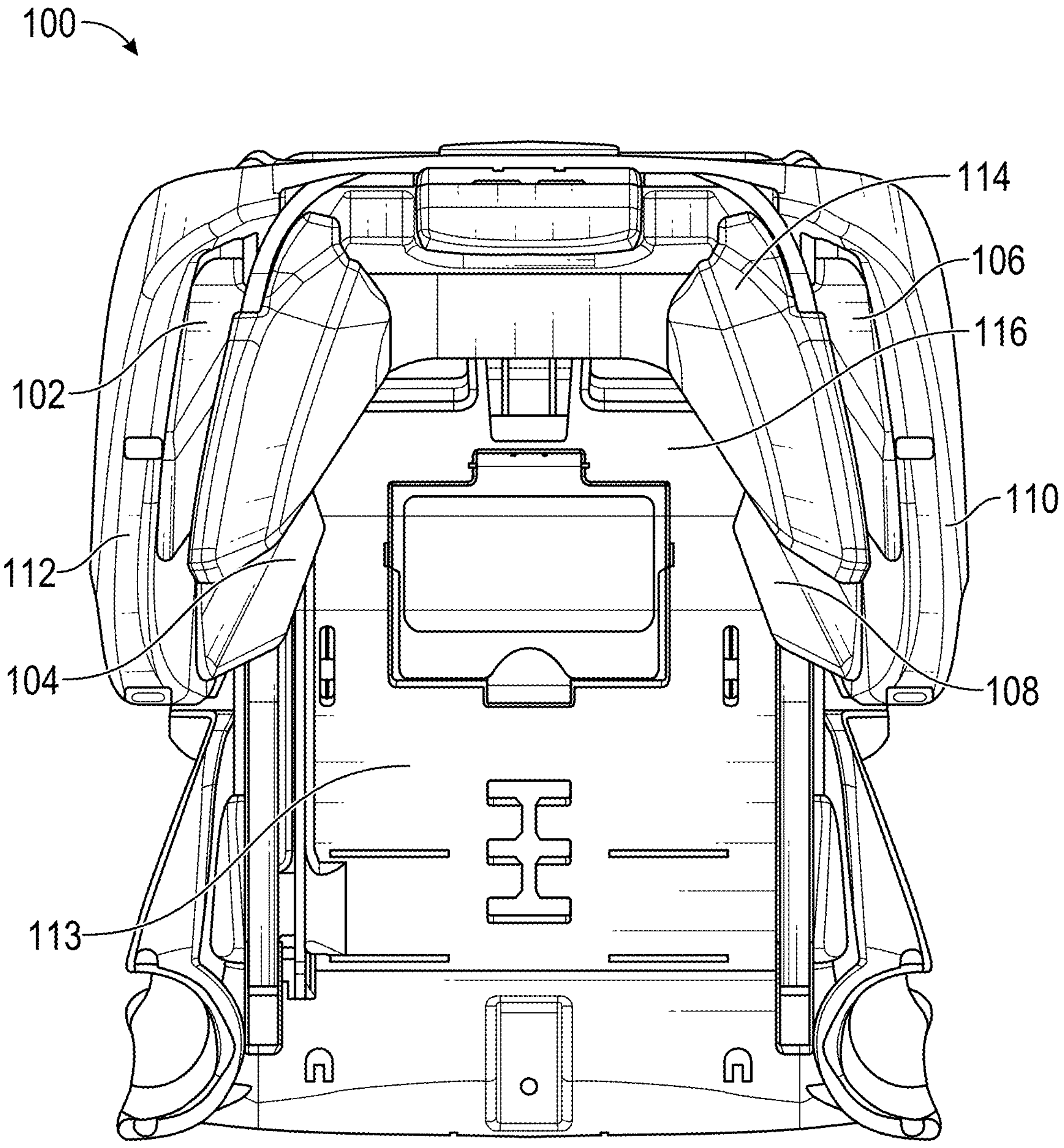
FIG. 1D is a top-down view of the child restraint system of FIG. 1A.

Turning to the figures, FIGS. 1A-1B are perspective views of a child restraint system 100 including internal side impact surfaces. FIG. 1C is a front view of the child restraint system 100 of FIG. 1A. FIG. 1C is a front view of the child restraint system 100 of FIG. 1A. The child restraint system 100 includes a seat 113, a headrest 114, a first sidewall 110, a second sidewall 112, a rear portion 116, and the plurality of internal side impact surfaces (for example, internal side impact surface 102, internal side impact surface 104, internal side impact surface 106, and internal side impact surface 108).

The plurality of internal side impact surfaces may include any suitable material. For example, the one or more side bumpers may include one or more foam materials, such as expanded polystyrene (EPS), Expanded Polypropylene (EPP), Expanded polyethylene (EPE), urethane, and/or a blend of any of these types of foams. The material may also include any other flexible materials other than foam as well. As another example, the plurality of internal side impact surfaces may include a more rigid material, such as a plastic or any other type of rigid material. In embodiments, the plurality of internal side impact surfaces may also be covered by another material, such as a fabric that may be provided over the various components of the child restraint system 100 to provide additional comfort to a child that is seated in the child restraint system 100.

Reference may be made herein to one or more "zones" of the child restraint system 100 (which may be applicable to any other child restraint system described herein. For example, one zone may include a headrest of the child restraint system 100, another zone may include the sidewalls of the child restraint system 100, and a third zone may include the seat of the child restraint system 100.

The plurality of internal side impact surfaces may be provided at locations on the child restraint system 100 above and/or below an arm of a child that is seated in the child restraint system 100. For example, internal side impact surfaces 102 and 106 may be upper internal side impact surfaces that are provided at a location of a child's shoulders when the child is in a seated position in the child restraint system 100. Likewise, internal side impact surfaces 104 and 108 may be lower internal side impact surfaces that are provided at a location of a child's hips when the child is in a seated position in the child restraint system 100. The internal side impact surfaces may also be provided at any other location on the child restraint system 100 as well.

This positioning of the plurality of internal side impact surfaces serves to form a void (for example, void 118 and void 120) or void in which the elbow (or entire arm) of the child may enter during a crash event of the vehicle. For example, if the force of a crash event causes the child to move towards the first sidewall 110, the arm of the child may enter into the void 118 between the internal side impact surface 106 and the internal side impact surface 108 and portions of the child's body above and below the child's arm (such as the shoulder and/or hip) may contact the internal side impact surface 106 and the internal side impact surface 108. Thus, instead of the child's arm initially coming into contact with the first sidewall 110 and causing a compression of the child's chest, the child's arm may stop within the void 118 (or the compression force of the child's arm against the first sidewall 110 may be reduced). Consequentially, the compression of the child's chest caused by the compression of the child's arm against the first sidewall 110 may be reduced or eliminated. This reduces or eliminates undesired compressions of the child's chest during the crash event.

The internal side impact surfaces may be any size and/or shape. Using the internal side impact surface 106 as an example, a front surface 122 may be provided that faces outwardly from the child restraint system 100 (that is, the front surface 122 faces the child that is seated in the child restraint system 100). The front surface 122 may be angled such that the front surface 122 slopes from the first sidewall 110 to the rear portion 116 of the child restraint system 100. The angle depicted in the figures is merely exemplary and the front surface 122 may be provided at any other angle.

An internal side impact surface (using the internal side impact surface 102 as an example) may also include a rear portion 124. The rear portion 124 may face inwardly towards the child restraint system 100 (for example, towards the second sidewall 122 and the rear portion 116 of the child restraint system 100). In embodiments, the rear portion 124 may be shaped in a manner that the internal side impact surface 102 may be removably inserted into the child restraint system 100 such that the rear portion 124 is flush with the second sidewall 122 and rear portion 116 of the child restraint system 100.

The internal side impact surfaces may be removably coupled to the child restraint system 100 using any number of suitable mechanisms. For example, as shown in FIG. 1A, the rear portion 124 of the internal side impact surface 102 includes one or more grooves 126. In embodiments, the internal side impact surface 126 may be slidably inserted into corresponding protrusions (not shown in the figure) on the child restraint system 100 such that the grooves 126 engage with the protrusions to removably secure the internal side impact surface 102 to the child restraint system 100.

The internal side impact surfaces may also be removably secured to the child restraint system using any other suitable mechanism. As another example, an internal side impact surface may be secured to the child restraint system 100 using one or more fasteners, such as a screw. As another example, an internal side impact surface may be secured to the child restraint system 100 using one or more tabs. As yet another example, an internal side impact surface may be secured to the child restraint system 100 using an adhesive. An internal side impact surface may also be secured to the child restraint system 100 using any combination of such mechanisms (or any other mechanism not mentioned herein).

Additionally, the size and/or shape of the internal side impact surfaces may vary depending on the type of child restraint system in which the internal side impact surfaces are provided (or integrated as permanent components of the child restraint system). For example, the size and/or shape of the rear portion of the internal side impact surfaces may vary such that the internal side impact surfaces may sit flush against a respective sidewall and/or rear portion of the child restraint system. As another example, the size of the internal side impact surfaces may depend on the size of the child for which the particular child restraint system is intended. That is, the size and/or shape of the internal side impact surfaces may vary to ensure that the elbow (or entire arm) of the child is able to be accommodated within the void that is formed between the internal side impact surfaces (in embodiments in which four internal side impact surfaces are used). Additional illustrations of various example shapes of the internal side impact surfaces are also shown in FIGS. 6A-7C.

Figure 6A:
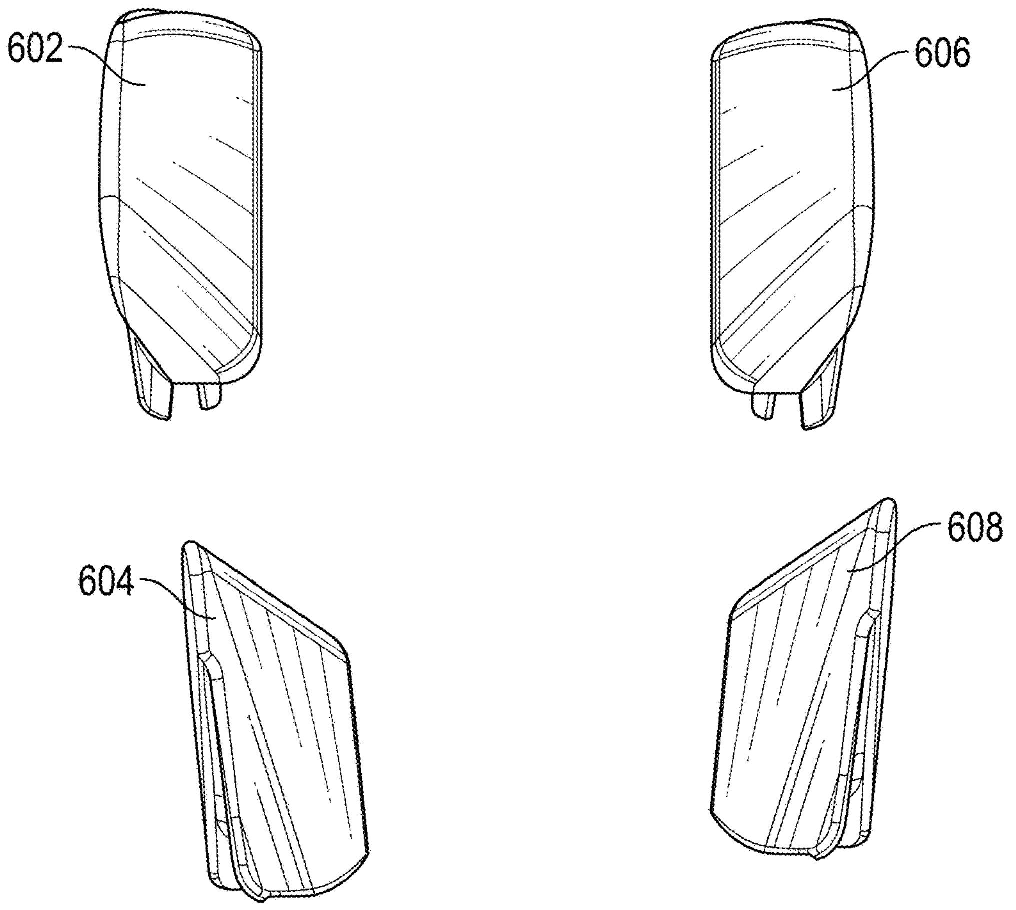
FIGS. 6A-6C are perspective views of internal side impact surfaces.
Figure 6B:
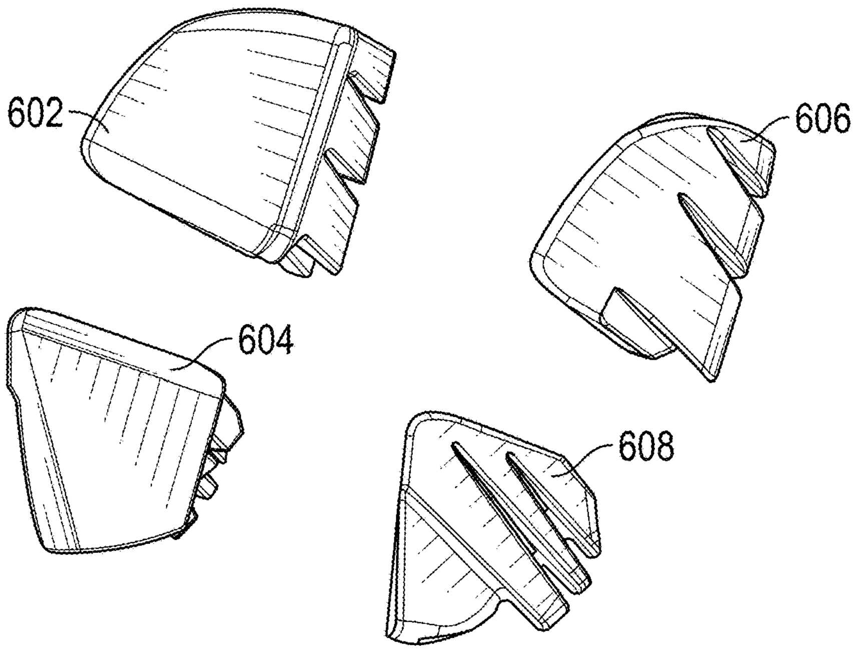
Figure 6C:
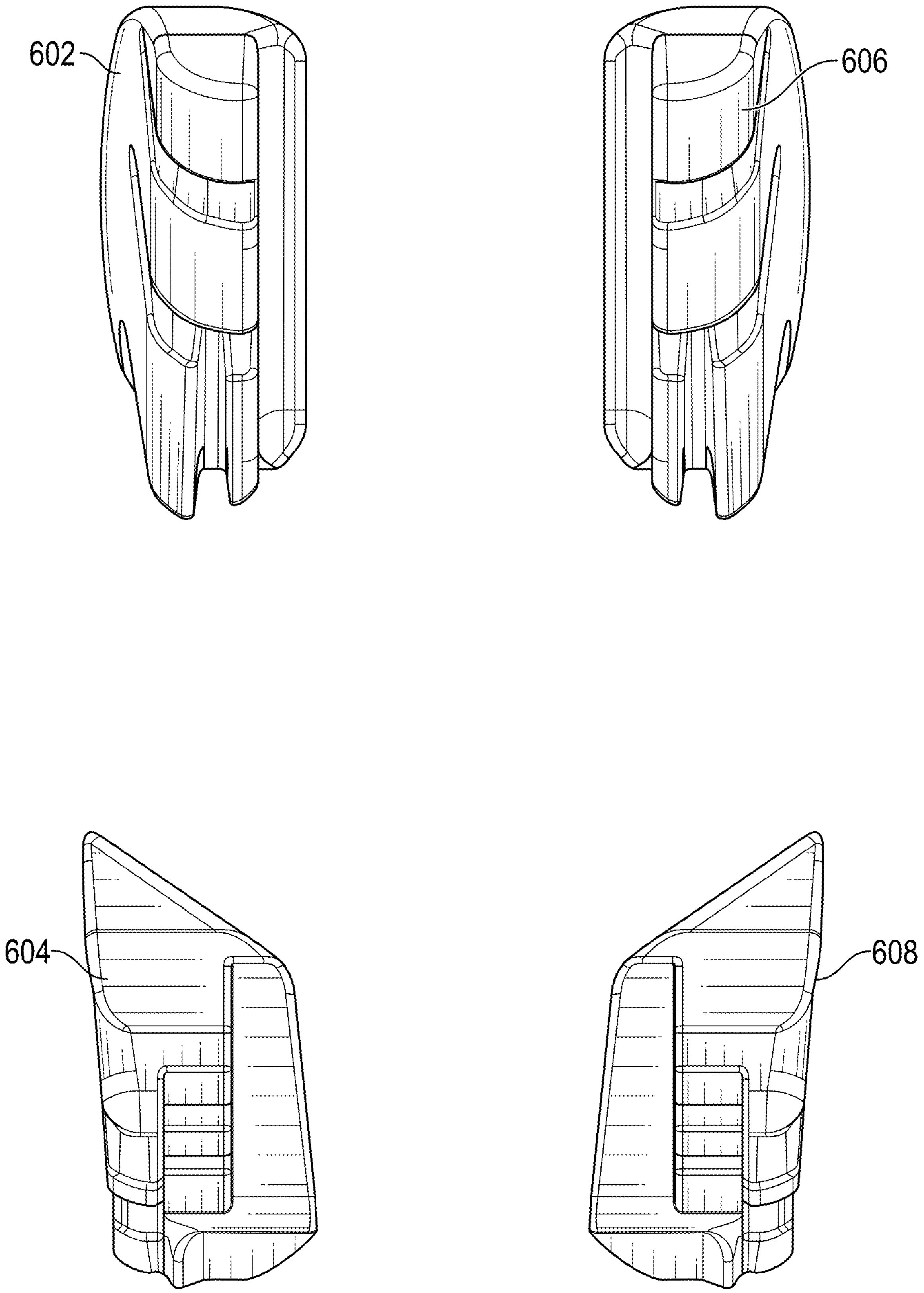

Particularly, FIGS. 6A-6C are perspective views of internal side impact surfaces (for example, upper internal side impact surfaces 102 and 106 and lower internal side impact surfaces 104 and 108). As shown in FIGS. 6A-6C, in embodiments, the internal side impact surfaces may be separate structures that are removably inserted into a child restraint system.

Additionally, in embodiments, a top edge of a lower internal side impact surface may deflect the child's elbow forward and out of the way of the child's chest, which can also mitigate or prevent compression against the child's chest. The flexibility (foam or ribbing structure) of the bumper can dissipate crash forces over a longer period of time, which can lower chest deflection.

Figure 7A:
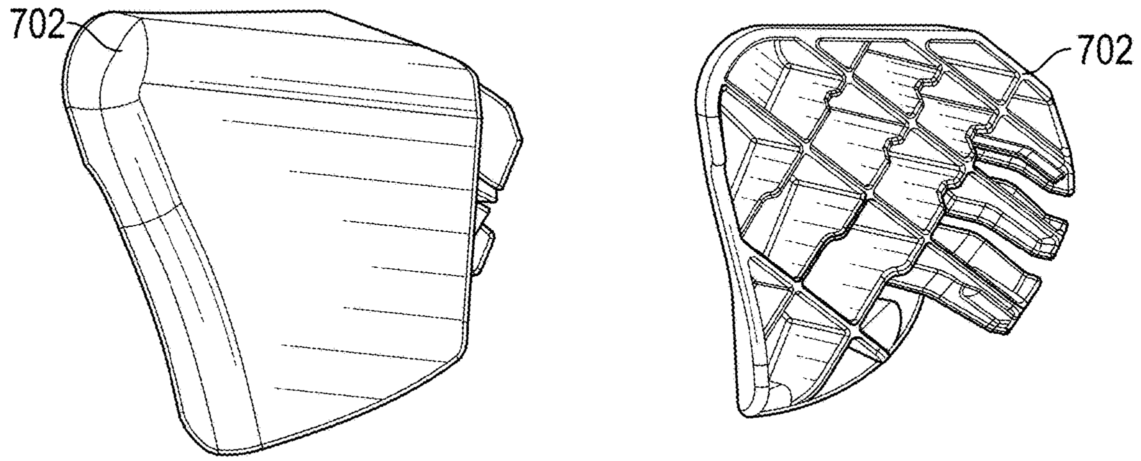
FIGS. 7A-7B are perspective views of alternative internal side impact surfaces.
Figure 7B:
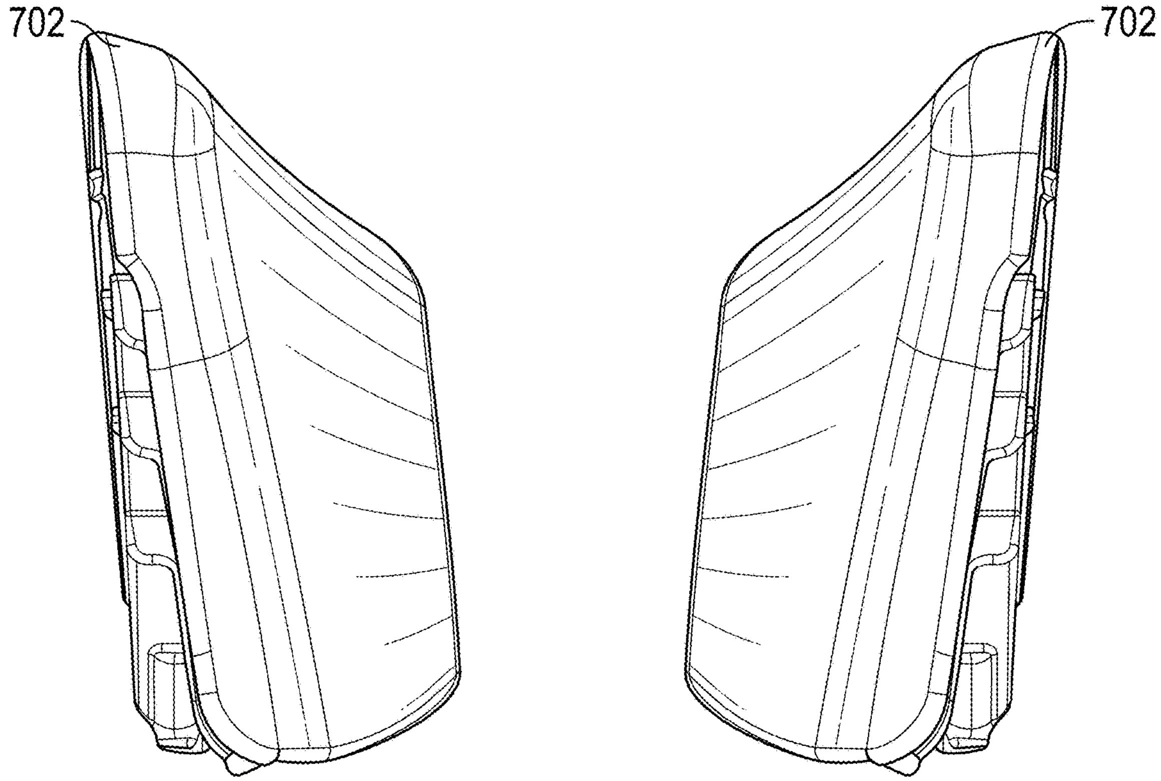
Figure 7C:
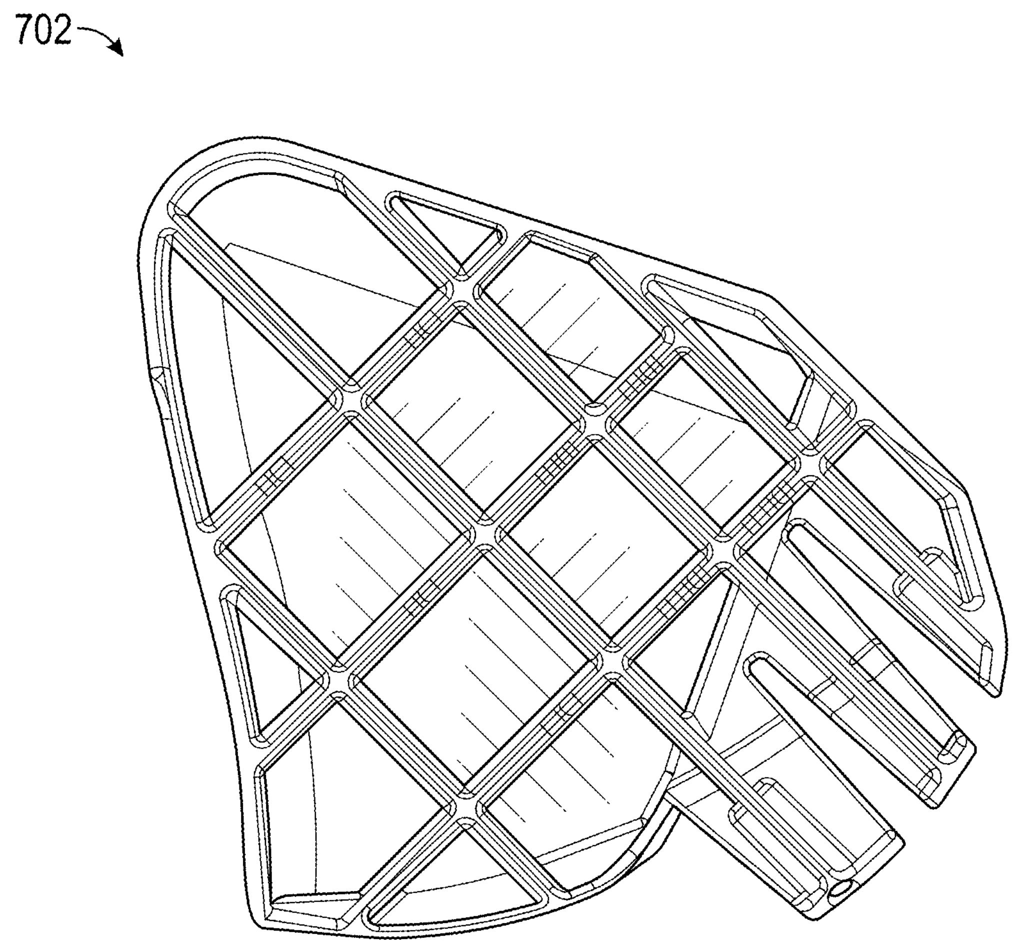
FIG. 7C is a rear view of the alternative internal side impact surfaces of FIGS. 7A-7B.

FIGS. 7A-7B are perspective views of alternative internal side impact surfaces. FIG. 7C is a rear view of the alternative internal side impact surfaces of FIGS. 7A-7B. In contrast with the internal side impact surfaces shown in FIGS. 6A-6C (which may include a solid material, such as a foam or plastic), the internal side impact surfaces shown in FIGS. 7A-7C may include ribbed rear portions 124. Including the ribs 702 in the rear portions 124 of the internal side impact surfaces may provide structural flexibility such that the internal side impact surfaces may compress during impact.

Figure 2:
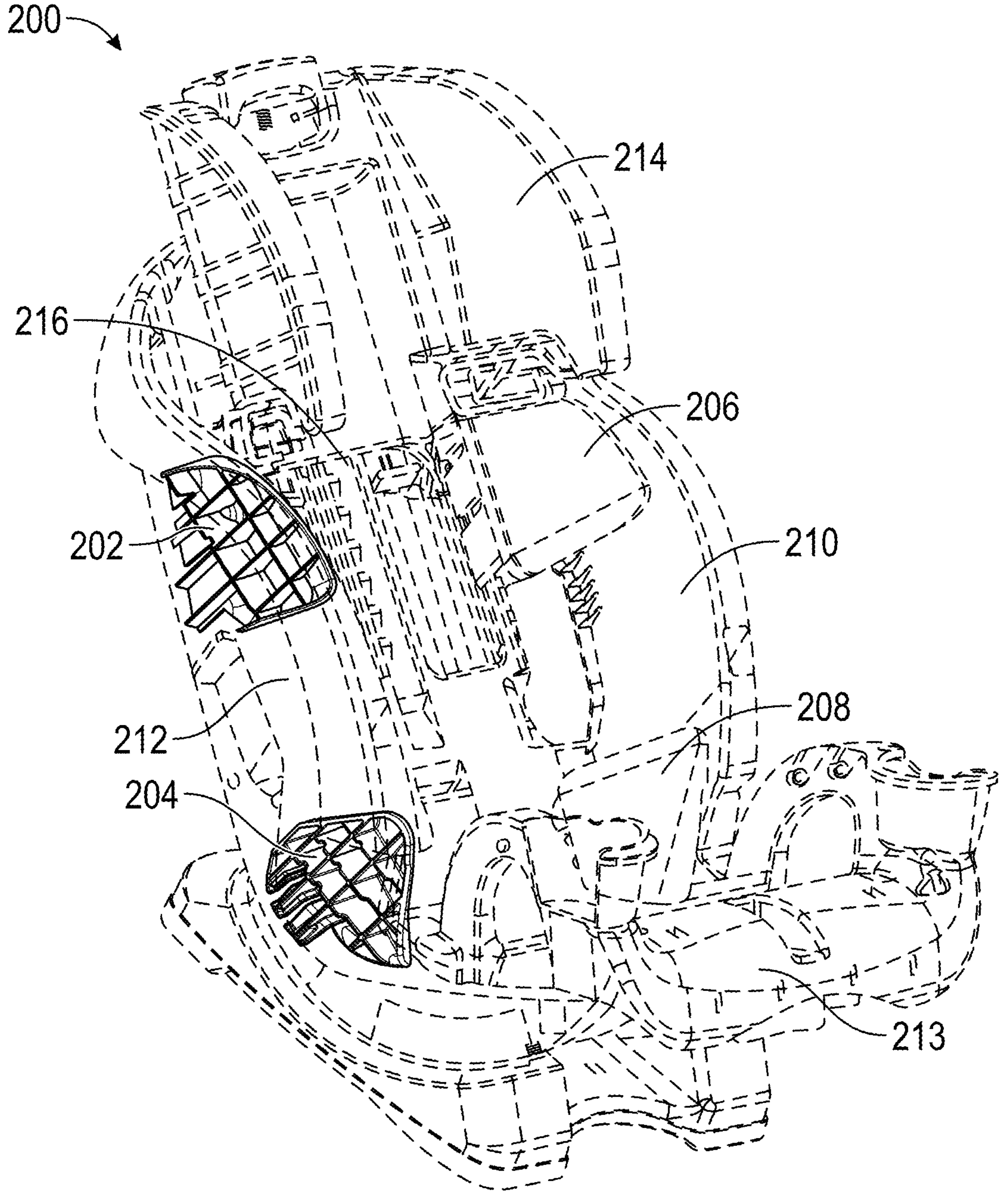
FIG. 2 is a perspective view of a child restraint system including alternative internal side impact surfaces.

FIG. 2 is a perspective view of a child restraint system 200 including alternative internal side impact surfaces. Similar to the child restraint system 100 of FIGS. 1A-1D, the child restraint system 200 includes a seat 213, a headrest 214, a first sidewall 210, a second sidewall 212, a rear portion 216, and the plurality of internal side impact surfaces (for example, internal side impact surface 202, internal side impact surface 204, internal side impact surface 206, and internal side impact surface 208).

Figure 3:
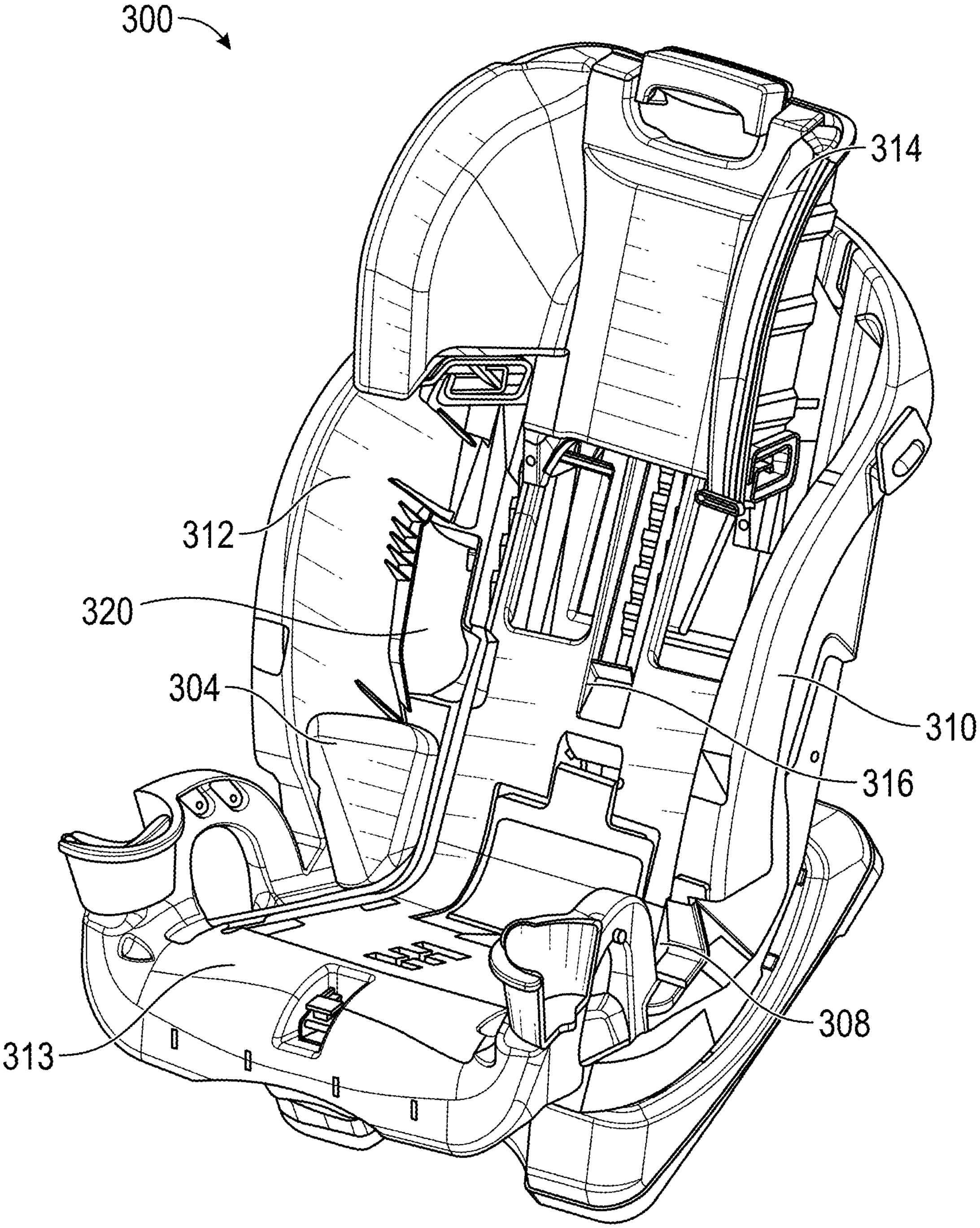
FIG. 3 is a perspective view of an alternative child restraint system including internal side impact surfaces.

FIG. 3 is a perspective view of an alternative child restraint system 300 including internal side impact surfaces. The child restraint system also includes a seat 313, headrest 314, a first sidewall 310, a second sidewall 310, a rear portion 316, and the plurality of internal side impact surfaces. However, the child restraint system 300 only includes two internal side impact surfaces in contrast with the four internal side impact surfaces shown in FIGS. 1A-1D and 2. Particularly, FIG. 3 illustrates an embodiment in which the child restraint system 300 includes two lower internal side impact surfaces (internal side impact surface 304 and internal side impact surface 308). The lower internal side impact surfaces limit the moment of the child's hips towards a respective sidewall of the child restraint system 300 during a crash event, while still allowing the elbow (or entire arm) of the child to fall into a corresponding void. For example, if a crash event forces the child towards the sidewall 312, the elbow (or entire arm) of the child may fall into the void 320 and the movement of the child's hips may be limited by the internal side impact surface 304. This, in turn, maintains the child's elbow (or entire arm) within the void 320 without compressing against the sidewall 312, or limits the amount of compression of the elbow (or entire arm) against the sidewall 312.

Although FIG. 3 shows an embodiment in which only lower internal side impact surfaces are provided, a child restraint system may similarly be provided with only upper internal side impact surfaces and/or any other combination of internal side impact surfaces provided at different positions on the child restraint system 300.

Figure 4:
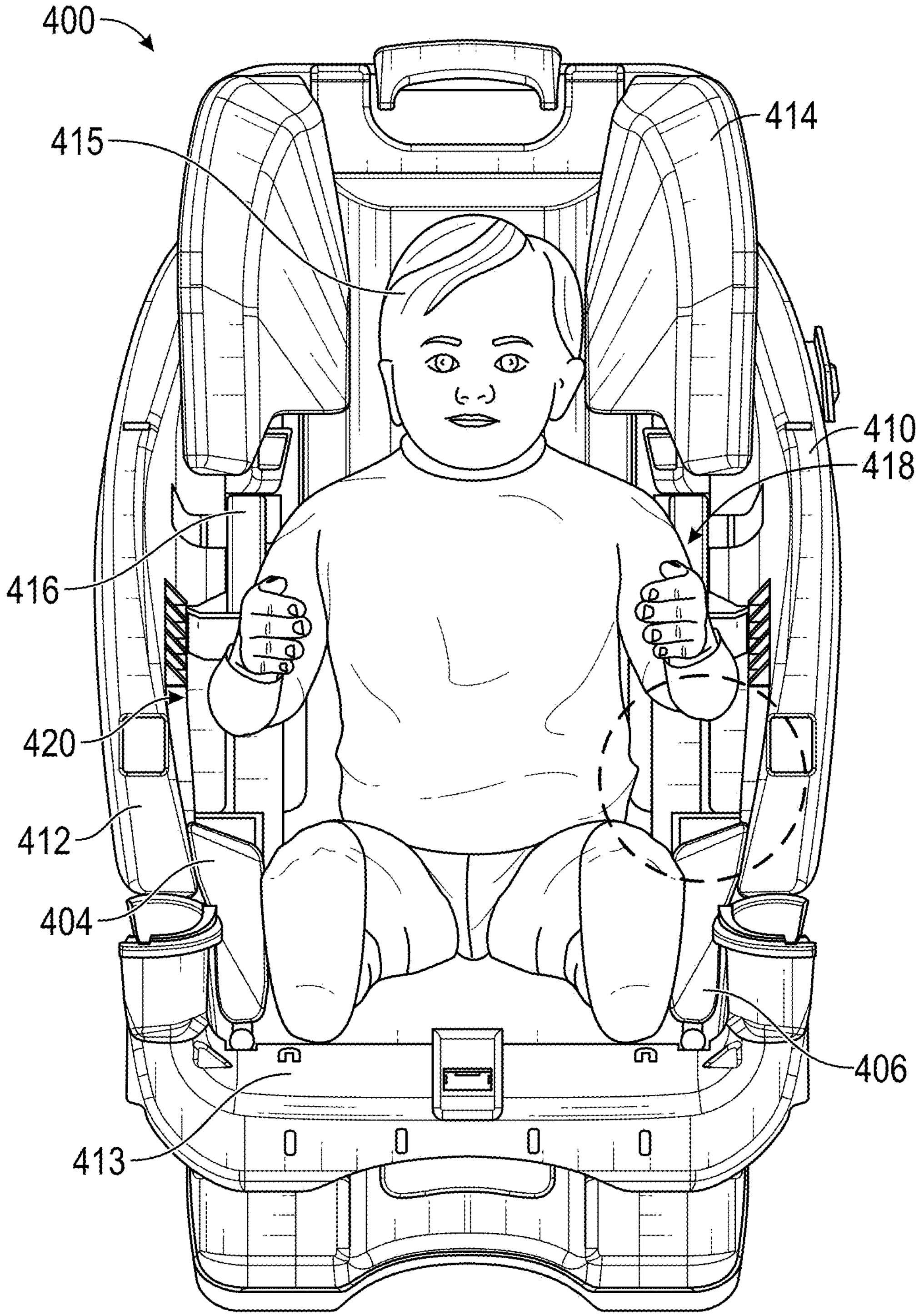
FIG. 4 is a front view of a child restraint system including a child seated in the child restraint system.

FIG. 4 is front view of a child restraint system 400 including a child 415 seated in the child restraint system 400. The child restraint system 400 also includes a seat 413, a headrest 414, a first sidewall 410, a second sidewall 412, a rear portion 416, and the plurality of internal side impact surfaces (for example, internal side impact surface 404 and internal side impact surface 406). Although the figure only shows two lower internal side impact surfaces being provided with the child restraint system 400, any other number of internal side impact surfaces may also be provided. For example, as shown in at least FIGS. 1A-1D, additional upper internal side impact surfaces may also be provided above the child's arm as well.

In embodiments, each of the internal side impact surfaces form respective voids located between the internal side impact surface and the corresponding sidewall. For example, a first void 420 is formed between internal side impact surface 404 and sidewall 412 and a second void 418 is formed between internal side impact surface 406 and sidewall 410.

The voids may be voids in which the elbows (or entire arms) of the child 415 may fall during a crash event, rather than initially compressing against a sidewall. As an example, in an existing child restraint system not including the internal side impact surface 406, a crash event that causes the child to travel towards the sidewall 410 may result in the child initially compressing the sidewall 410. This compression of the arm of the child 415 against the sidewall 410 may then cause a compression of the chest of the child 415. In contrast, during a similar crash event in which the child 415 is seated in the child restraint system 400, the elbow (or entire arm) of the child 415 may fall into the void 418, rather than initially compressing against the sidewall 410. The hips of the child 415 first come into contact with the internal side impact surface 406 and limit the movement of the child 415 further towards the sidewall 410.

In embodiments in which an additional internal side impact surface is provided at the sidewall 410 (for example, as shown in FIG. 1A), the shoulder of the child 415 contacts the additional internal side impact surface as the hips of the child 415 contact the internal side impact surface 406. The use of the two internal side impact surfaces at the sidewall 410 further serves to mitigate (or prevent) compression of the elbow (or entire arm) of the child 415 into the sidewall during the crash event.

Figure 5:
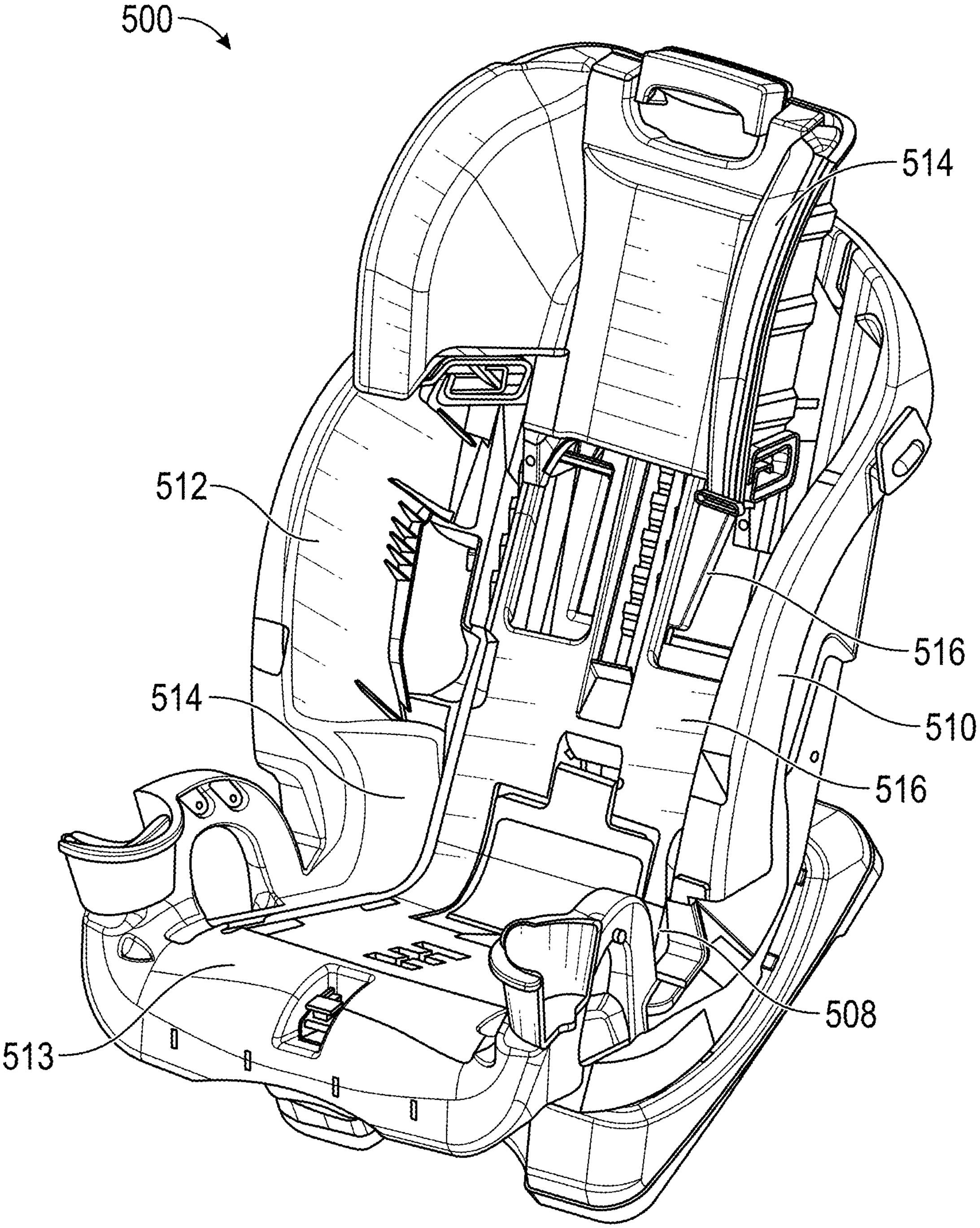
FIG. 5 is a perspective view of an alternative child restraint system including integrated internal side impact surfaces.

FIG. 5 is a perspective view of an alternative child restraint system 500 including integrated internal side impact surfaces. The child restraint system also includes a seat 513, a headrest 514, a first sidewall 510, a second sidewall 510, a rear portion 516, a rear portion 816 and the plurality of internal side impact surfaces (for example, internal side impact surface 514 and internal side impact surface 508).

In contrast with internal side impact surfaces associated with other child restraint systems described herein, the internal side impact surface 504 and internal side impact surface 508 are permanently integrated into the child restraint system 500, rather than being removably coupled to the child restraint system 500. That is, the internal side impact surfaces may be formed as part of the sidewalls of the child restraint system 500. For example, the child restraint system 500 may include raised portions at the locations on the child restraint system 500 at which removable internal side impact surfaces may be provided in other. In embodiments, the material of the integrated internal side impact surfaces may be the same material used throughout the remainder of the child restraint system 500. For example, if the child restraint system 500 is formed from a plastic material, a raised portion in the shape of an internal side impact surface may be provided from the child restraint system 500 at the locations of the integrated internal side impact surfaces. However, in other embodiments, a different type of material may also be sued for the integrated internal side impact surfaces.

Although FIG. 5 shows an embodiment in which only lower internal side impact surfaces are provided, a child restraint system 500 may similarly be provided with only upper internal side impact surfaces and/or any other combination of internal side impact surfaces provided at different positions on the child restraint system 500.

Figure 8:
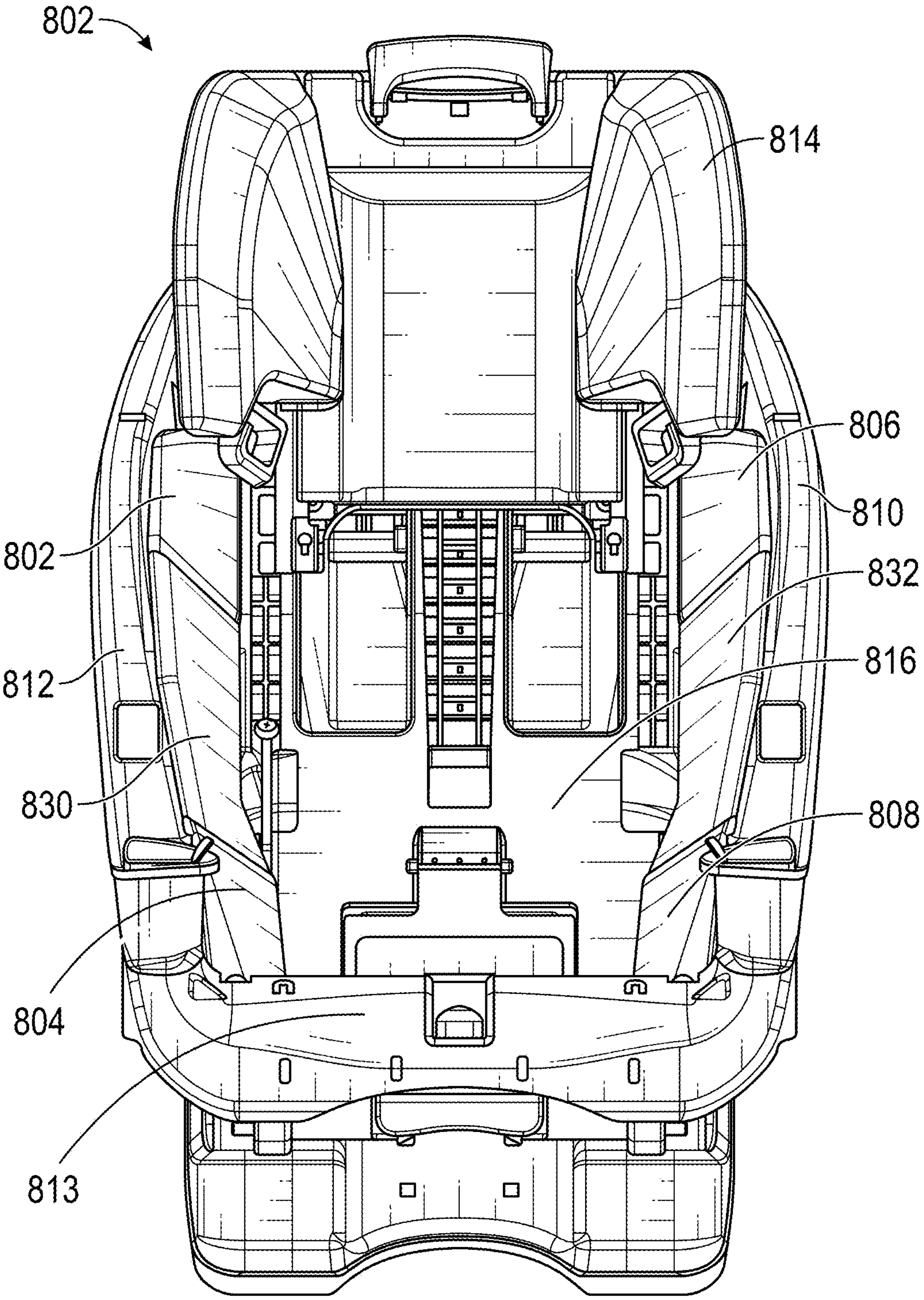
FIG. 8 is a front view of an alternative child restraint system including internal side impact surfaces.

FIG. 8 is front view of an alternative child restraint system 800 including internal side impact surfaces. The child restraint system also includes a seat 813, headrest 814, a first sidewall 810, a second sidewall 810, a rear portion 816, a rear portion 816 and the plurality of internal side impact surfaces (for example, internal side impact surface 802, internal side impact surface 804, internal side impact surface 806, and internal side impact surface 808).

The alternative child restraint system 800 differs from other child restraint systems shown herein in that the child restraint system 800 also includes additional compressible portions in between respective internal side impact surfaces (for example, at the locations in which the voids are provided in alternative embodiments described herein). As shown in the figure, compressible material 830 is provided at the sidewall 812 between the internal side impact surface 802 and internal side impact surface 804 and compressible material 832 is provided at the sidewall 810 between the internal side impact surface 806 and internal side impact surface 808. The compressible material may also be provided in any other configuration of child restraint system as well (for example, configurations in which a child restraint system only includes two internal side impact surfaces).

In embodiments, the compressible material may be a material that is less rigid than the material used for the internal side impact surfaces such that the compressible material may compress further from contact by a child during a crash event than the internal side impact surfaces. For example, the compressible material may include a foam material and the internal side impact surfaces may include a plastic material (however, this is merely exemplary).

The configuration shown in the child restraint system 800 may provide similar functionality as the configurations shown in the child restraint systems in which a void is provided between the internal side impact surfaces, rather than providing a material between the internal side impact surfaces, as shown in FIG. 8. That is, the internal side impact surfaces may compress less than the compressible material, causing the elbow (or entire arm) of the child to travel further into the compressible material than the shoulder and/or hip of the child would travel into the internal side impact surfaces. This reduces the compression force against the child's chest that would otherwise be caused by a compression of the child's arm.

Figure 9:
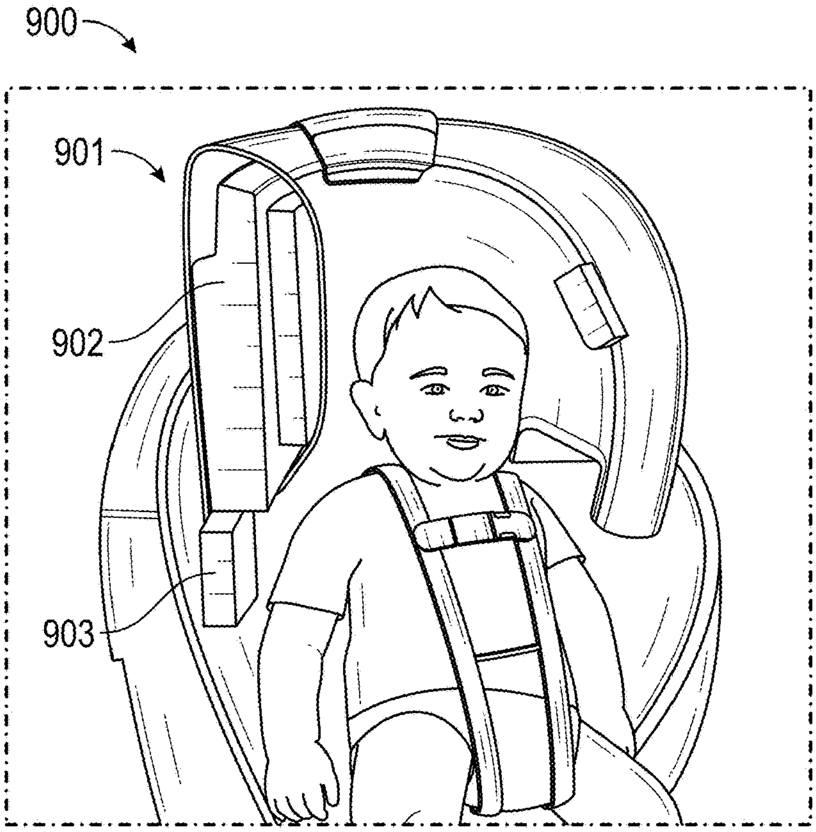
FIG. 9 is a perspective view of a child restraint system including alternative internal side impact surfaces.
Figure 10:
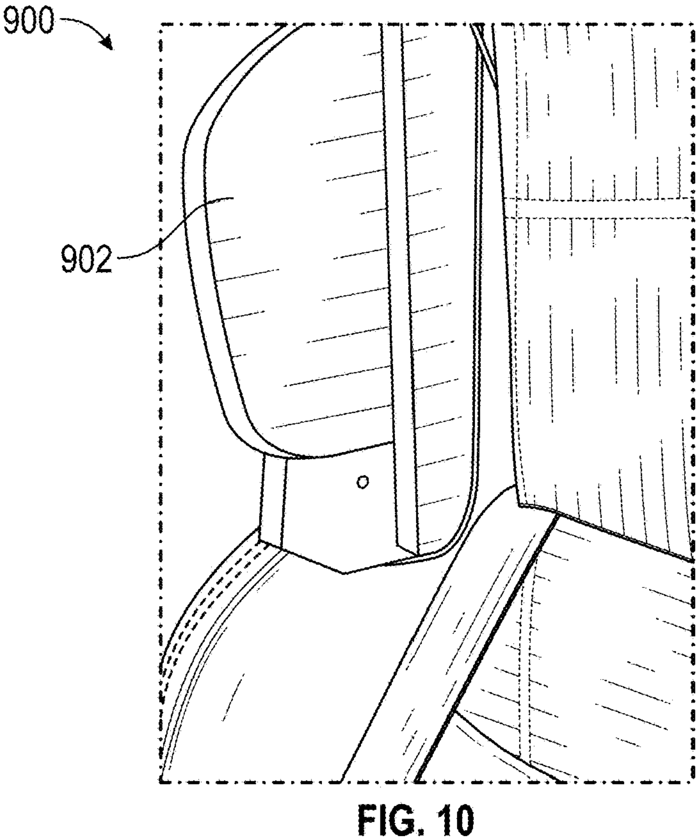
FIG. 10 is a close-up view of an internal side impact surface of the child restraint system of FIG. 9.

FIG. 9 is a perspective view of a child restraint system 900 including alternative internal side impact surfaces 902. FIG. 10 is a close-up view of an internal side impact surface 902 of the child restraint system 900 of FIG. 9. FIGS. 9-10 illustrate that the internal side impact surfaces are not necessarily limited to only being provided on the sidewalls of a child restraint system but may also be provided on the headrest 901 of the child restraint system 900 as well. The internal side impact surfaces may also be provided on both the headrest 901 and the sidewalls. In some embodiments, the side impact surfaces may be adjustable between the headrest 901 and the sidewalls. For example, the side impact surfaces may be removably inserted into the headrest 901 and/or sidewalls. The side impact surfaces may also be otherwise adjustable in any other manner (for example, adjusted up and down, etc.). In some embodiments, the child restraint system 900 may include padding 903. The padding 903 (which may be foam or any other suitable material) may be provided, for example, at the bottom of the headrest. The padding 903 may follow shoulder of the occupant as the headrest moves up and down, thus bracing off of the shoulder and forming a void and/or compressible region for the arm of the child.

Figure 11:
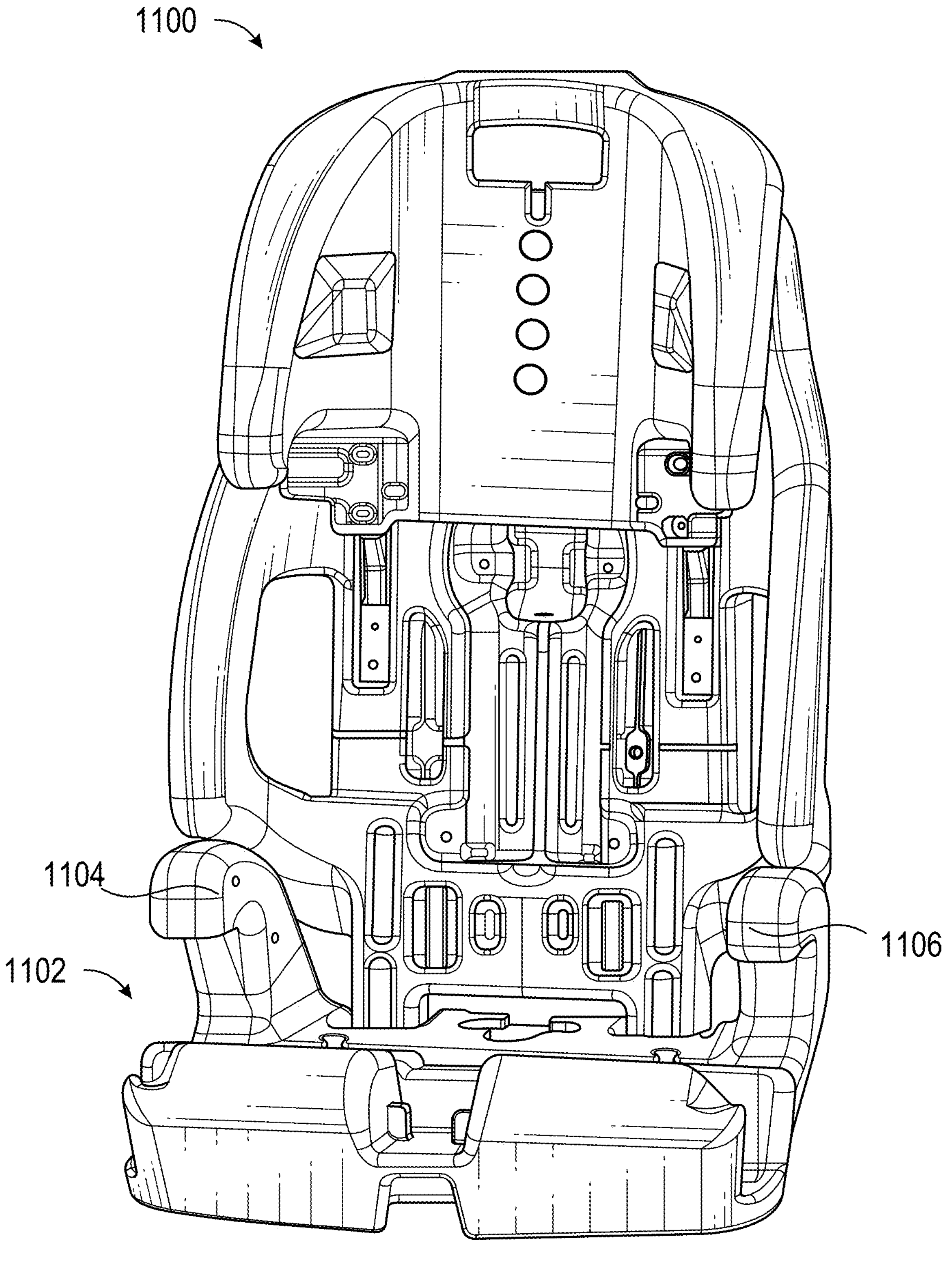
FIG. 11 is a perspective view of a child restraint system including alternative internal side impact surfaces.
Figure 12A:
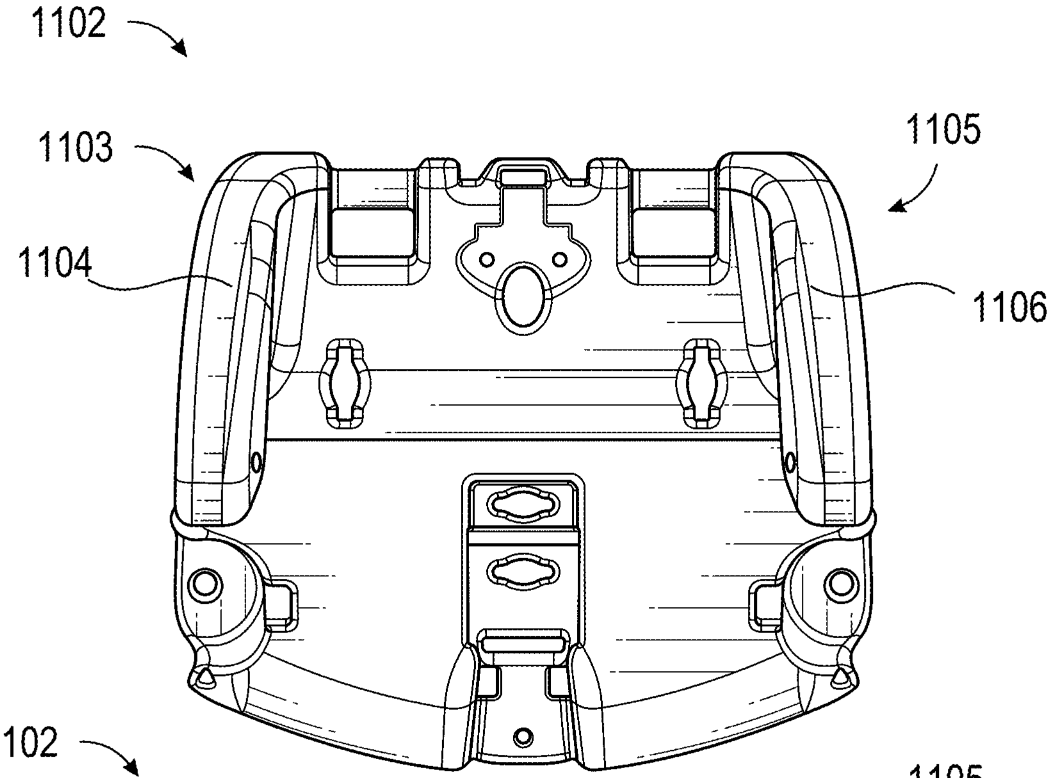
FIG. 12A is a top-down view of a seat of the child restraint system of FIG. 11.
Figure 12B:
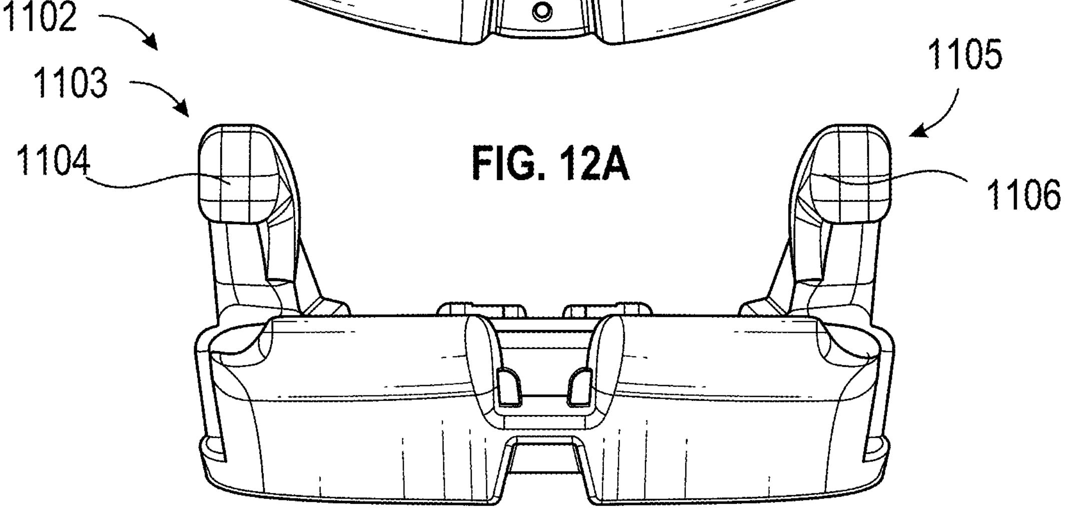
FIG. 12B is a front view of the seat of the child restraint system of FIG. 11.
Figure 13:
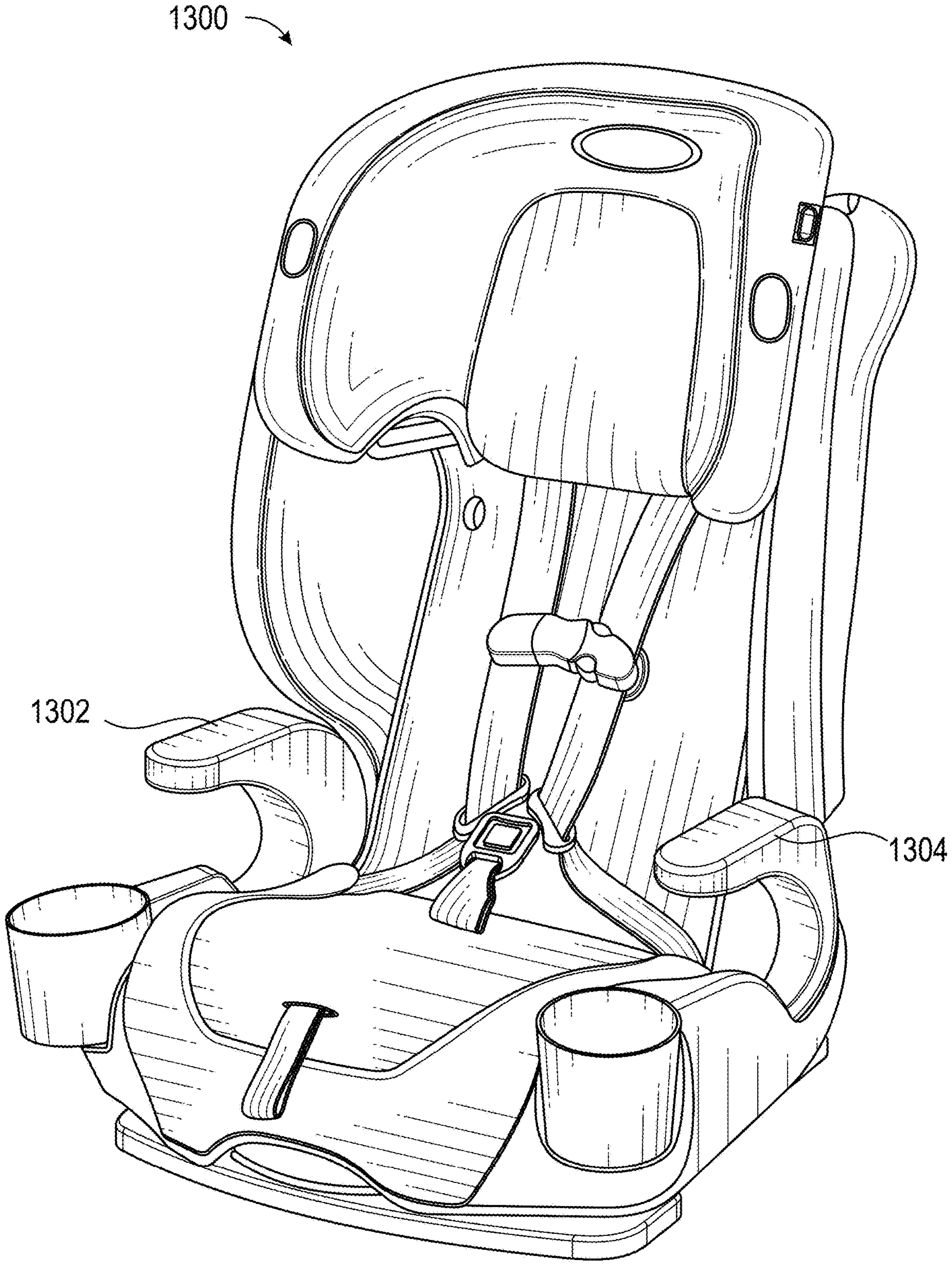
FIG. 13 is a perspective view of a child restraint system including alternative internal side impact surfaces.

FIG. 11 is a perspective view of a child restraint system 1100 including alternative internal side impact surfaces. FIG. 13 is another perspective view of another child restraint system 1300. FIGS. 11 and 13 illustrate that side impact surfaces may also be provided on armrests of the child restraint system 1100 (for example, first side impact surface 1104 provided on first armrest 1103 and second side impact surface 1106 provided on second armrest 1105). FIG. 12A is a top-down view of a seat 1102 of the child restraint system 1100 of FIG. 11. FIG. 12B is a front view of the seat 1102 of the child restraint system 1100 of FIG. 11. Any of the side impact surfaces shown in FIGS. 9-13 may be removably inserted into the child restraint system or may be integrated into the child restraint system. Similar to the side impact surfaces described with respect to the prior figures, the side impact surfaces shown in FIGS. 9-13 may also reduce the compression force against the child's chest that would otherwise be caused by a compression of the child's arm.

Though the disclosed examples include particular arrangements of a number of parts, components, features, and aspects, the disclosure is not limited to only those examples or arrangements shown. Any one or more of the parts, components, features, and aspects of the disclosure may be employed alone or in other arrangements of any two or more of the same.

Although certain product features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Unless otherwise noted, the terms used herein are to be understood according to conventional usage by those of ordinary skill in the relevant art. In addition to the definitions of terms provided below, it is to be understood that as used in the specification and in the claims, "a" or "an" may mean one or more, depending upon the context in which it is used.

Throughout this application, the term "include," "include (s)" or "including" means "including but not limited to." Note that certain embodiments may be described relating to a single element, but the corresponding description should be read to include embodiments of two or more elements. Different features, variations, and multiple different embodiments are shown and described herein with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and drawings includes examples of systems, apparatuses, methods, devices, and/or techniques. It is, of course, not possible to describe every conceivable combination of components and/or methods for purposes of describing the various elements of the disclosure, but it may be recognized that many further combinations and permutations of the disclosed elements are possible. Accordingly, it may be apparent that various modifications may be made to the disclosure without departing from the scope thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A child restraint system comprising:

a seat;

a headrest;

a first sidewall and a second sidewall; and a plurality of internal side impact surfaces including at least a first internal side impact surface that is removably inserted into the first sidewall or is formed as a raised portion of the first sidewall and a second internal side impact surface that is removably inserted into the second sidewall or is formed as a raised portion of the second sidewall, wherein a first void is formed above or below the first internal side impact surface and the first sidewall and a second void is formed above or below the second internal side impact surface and the second sidewall, and wherein at least one of: the first void or the second void are configured to receive, during a crash event, an elbow or an arm of a vehicle occupant seated in the child restraint system; and wherein the first internal side impact surface includes one or more grooves on a rear portion of the first internal side impact surface, wherein the one or more grooves are configured to engage with structural elements of the first sidewall to removably insert the first internal side impact surface into the first sidewall.

2. The child restraint system of claim 1, wherein the plurality of internal side impact surfaces further comprises a third internal side impact surface provided at the first sidewall and a fourth internal side impact surface provided at the second sidewall, wherein the first void is formed between the first internal side impact surface, the first sidewall, and the third internal side impact surface, and wherein the second void is formed between the second internal side impact surface, the second sidewall, and the fourth internal side impact surface.

3. The child restraint system of claim 2, wherein the first internal side impact surface includes a front surface that slopes inward from the first sidewall to a rear portion of the child restraint system.

4. The child restraint system of claim 1, further comprising a first compressible material provided in the first void and a second compressible material provided in the second void, wherein the first compressible material is configured to compress further than the first internal side impact surface and the second compressible material is configured to compress further than the second internal side impact surface.

5. The child restraint system of claim 1, wherein the plurality of internal side impact surfaces comprise a plastic or foam material.

6. The child restraint system of claim 1, wherein the plurality of internal side impact surfaces include a ribbed rear portion.

7. A child restraint system comprising:

a first zone including a seat;

a second zone including a first sidewall and a second sidewall; and a third zone including a headrest, wherein at least one of the first zone or the second zone are offset from the second zone;

wherein the second zone includes a first void or a first compressible material and the second zone includes a second void or a second compressible material, and wherein the second zone is configured to receive, during a crash event, an elbow or an arm of a vehicle occupant seated in the child restraint system; and wherein at least one of the first zone or the third zone includes a first side impact surface and a second side impact surface, and wherein the first internal side impact surface includes one or more grooves on a rear portion of the first internal side impact surface, wherein the one or more grooves are configured to engage with structural elements of the first sidewall to removably insert the first internal side impact surface into the first sidewall.

8. The child restraint system of claim 7, wherein the plurality of internal side impact surfaces further comprises a third internal side impact surface provided at the first sidewall and a fourth internal side impact surface provided at the second sidewall, wherein a first pocket is formed between the first internal side impact surface, the first sidewall, and the third internal side impact surface, and wherein a second pocket is formed between the second internal side impact surface, the second sidewall, and the fourth internal side impact surface.

9. The child restraint system of claim 7, wherein the first internal side impact surface includes a front surface that slopes inward from the first sidewall to a rear portion of the child restraint system.

10. The child restraint system of claim 7, wherein the plurality of internal side impact surfaces comprise a plastic or foam material.

11. The child restraint system of claim 7, wherein the plurality of internal side impact surfaces include a ribbed rear portion.

12. A child restraint system comprising:

a seat a headrest;

a first sidewall and a second sidewall; and a plurality of internal side impact surfaces including at least a first internal side impact surface that is removably inserted into the first sidewall and a second internal side impact surface that is removably inserted into the second sidewall, wherein a first void is formed between the first internal side impact surface and the first sidewall and a second void is formed between the second internal side impact surface and the second sidewall; and a first compressible material provided in the first void and a second compressible material provided in the second void, wherein the first compressible material is configured to compress further than the first internal side impact surface and the second compressible material is configured to compress further than the second internal side impact surface, wherein the first compressible material or the second compressible material are configured to receive, during a crash event, an elbow or an arm of a vehicle occupant seated in the child restraint system; and wherein the first internal side impact surface includes one or more grooves on a rear portion of the first internal side impact surface, wherein the one or more grooves are configured to engage with structural elements of the first sidewall to removably insert the first internal side impact surface into the first sidewall.

13. The child restraint system of claim 12, wherein the plurality of internal side impact surfaces further comprises a third internal side impact surface provided at the first sidewall and a fourth internal side impact surface provided at the second sidewall, wherein the first void is formed between the first internal side impact surface, the first sidewall, and the third internal side impact surface, and wherein the second void is formed between the second internal side impact surface, the second sidewall, and the fourth internal side impact surface.

14. The child restraint system of claim 13, wherein the first internal side impact surface includes a front surface that slopes inward from the first sidewall to a rear portion of the child restraint system.

15. The child restraint system of claim 12, wherein the plurality of internal side impact surfaces comprise a plastic or foam material.

16. A child restraint system comprising:

a seat;

a headrest;

a first sidewall and a second sidewall; and a plurality of internal side impact surfaces including at least a first internal side impact surface that is adjustable between the headrest and the first sidewall and a second internal side impact surface that is adjustable between the headrest and the second sidewall, wherein a first void is formed above or below the first internal side impact surface and the first sidewall or the headrest and a second void is formed above or below the second internal side impact surface and the second sidewall or the headrest, and wherein at least one of: the first void or the second void are configured to receive, during a crash event, an elbow or an arm of a vehicle occupant seated in the child restraint system; and wherein the first internal side impact surface includes one or more grooves on a rear portion of the first internal side impact surface, wherein the one or more grooves are configured to engage with structural elements of the first sidewall to removably insert the first internal side impact surface into the first sidewall.

* * * * *